(12) United States Patent
Kajihara

(10) Patent No.: US 12,072,275 B2
(45) Date of Patent: Aug. 27, 2024

(54) BIOPARTICLE ANALYZER AND MICROPARTICLE ANALYZER

(71) Applicant: SONY GROUP CORPORATION, Tokyo (JP)

(72) Inventor: Junji Kajihara, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 267 days.

(21) Appl. No.: 17/753,916

(22) PCT Filed: Jul. 8, 2020

(86) PCT No.: PCT/JP2020/026692
§ 371 (c)(1),
(2) Date: Mar. 18, 2022

(87) PCT Pub. No.: WO2021/065140
PCT Pub. Date: Apr. 8, 2021

(65) Prior Publication Data
US 2022/0326139 A1    Oct. 13, 2022

(30) Foreign Application Priority Data
Sep. 30, 2019   (JP) ................................ 2019-180259

(51) Int. Cl.
*G01N 15/1434*   (2024.01)
*G02B 5/20*   (2006.01)
(Continued)

(52) U.S. Cl.
CPC ......... *G01N 15/1434* (2013.01); *G02B 5/208* (2013.01); *G02B 5/26* (2013.01);
(Continued)

(58) Field of Classification Search
CPC ........... G01N 15/1429; G01N 15/1434; G01N 15/1459; G01N 21/49; G01N 21/64;
(Continued)

(56) References Cited

U.S. PATENT DOCUMENTS

| 4,076,420 A | * | 2/1978 | De Maeyer | .......... | G01N 21/272 |
| | | | | | 356/73 |
| 4,498,766 A | * | 2/1985 | Unterleitner | ....... | G01N 15/1434 |
| | | | | | 356/73 |

(Continued)

FOREIGN PATENT DOCUMENTS

| CN | 102156088 A | 8/2011 |
| CN | 103674896 A | 3/2014 |

(Continued)

OTHER PUBLICATIONS

International Search Report and Written Opinion of PCT Application No. PCT/JP2020/026692, issued on Oct. 6, 2020, 08 pages of ISRWO.

*Primary Examiner* — Isiaka O Akanbi
(74) *Attorney, Agent, or Firm* — CHIP LAW GROUP

(57) ABSTRACT

Provided is a bioparticle analyzer including a scattered light detection module including an optical filter that separates, from a partial light in laser beam, scattered light generated by irradiating a bioparticle flowing through a channel with the laser beam, and an objective lens on which the scattered light separated by the optical filter is incident. Furthermore, the present technology also provides a microparticle analyzer including a scattered light detection module including an optical filter that separates, from a partial light in a laser beam, scattered light generated by irradiating a microparticle flowing through a channel with the laser beam, and an objective lens on which the scattered light separated by the optical filter is incident.

14 Claims, 5 Drawing Sheets

(51) Int. Cl.
  *G02B 5/26* (2006.01)
  *G01N 15/01* (2024.01)
  *G01N 15/10* (2006.01)
  *G01N 15/149* (2024.01)
(52) U.S. Cl.
  CPC ..... *G01N 15/01* (2024.01); *G01N 2015/1006* (2013.01); *G01N 15/149* (2024.01)
(58) Field of Classification Search
  CPC . G01N 2015/1006; G01N 2201/06113; G01N 2201/12
  USPC ........... 356/336–337, 338, 326, 73, 335–344
  See application file for complete search history.

(56) References Cited

U.S. PATENT DOCUMENTS

| | | | | |
|---|---|---|---|---|
| 4,954,715 A | * | 9/1990 | Zold | G01N 15/1404 356/338 |
| 5,260,764 A | * | 11/1993 | Fukuda | G01N 15/14 356/336 |
| 11,204,310 B2 | * | 12/2021 | Magnin | G01N 15/1436 |
| 2002/0103439 A1 | * | 8/2002 | Zeng | G01J 3/0289 600/476 |
| 2007/0195310 A1 | * | 8/2007 | Kanda | G01N 15/1433 356/73 |
| 2011/0127444 A1 | * | 6/2011 | Ozasa | G01N 15/1433 356/336 |
| 2012/0287435 A1 | | 11/2012 | Adams et al. | |
| 2014/0087453 A1 | | 3/2014 | Tahara | |
| 2014/0099659 A1 | * | 4/2014 | Keller | G02B 21/362 435/29 |
| 2018/0246035 A1 | * | 8/2018 | Hasegawa | G01N 33/18 |
| 2021/0245202 A1 | * | 8/2021 | Ito | B07C 5/342 |

FOREIGN PATENT DOCUMENTS

| | | |
|---|---|---|
| EP | 2327977 A2 | 6/2011 |
| JP | 09-292570 A | 11/1997 |
| JP | 2011-133460 A | 7/2011 |
| JP | 2014-062822 A | 4/2014 |
| JP | 2014-202573 A | 10/2014 |
| WO | 2012/154995 A2 | 11/2012 |

\* cited by examiner

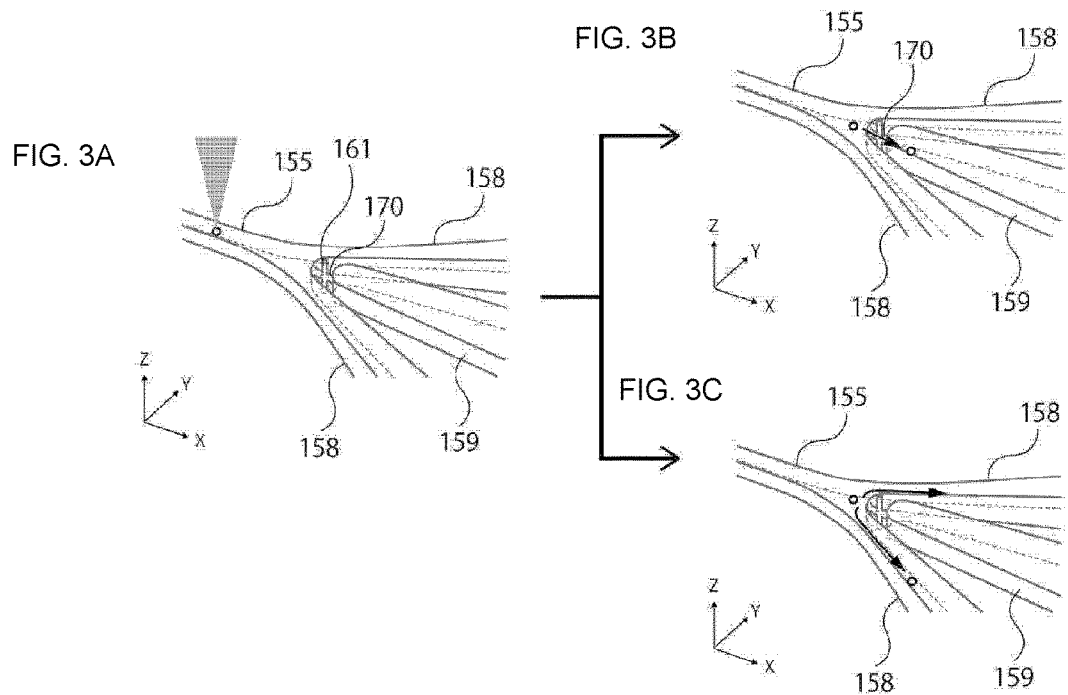
FIG. 3A FIG. 3B FIG. 3C
FIG. 4
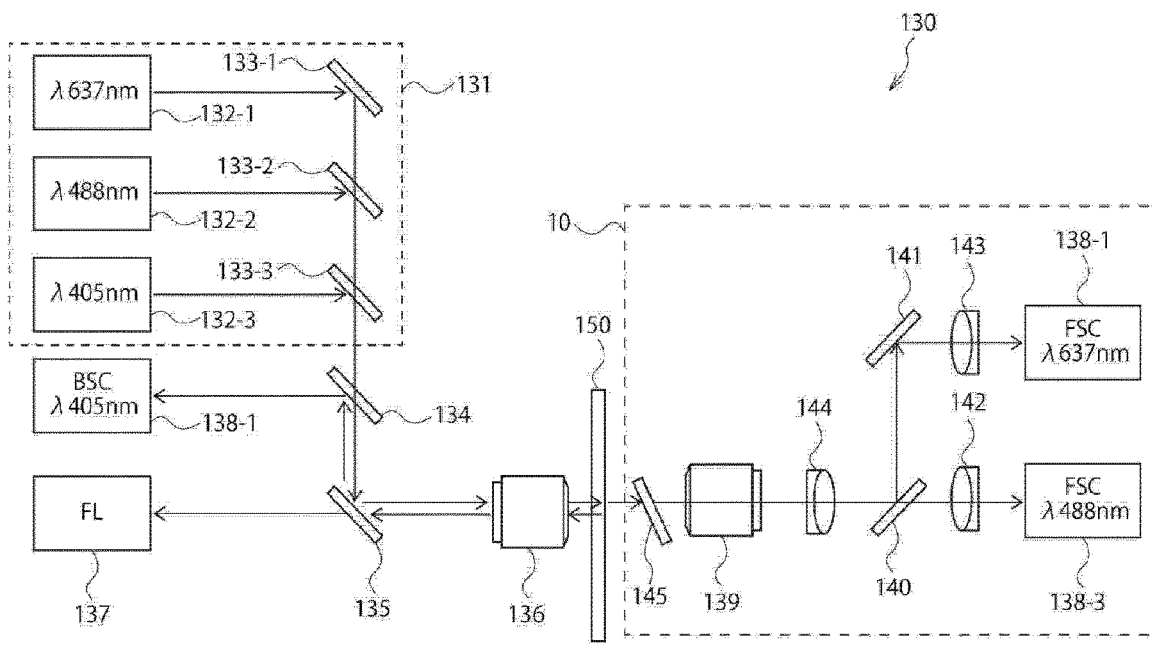

BIOPARTICLE ANALYZER AND MICROPARTICLE ANALYZER

CROSS REFERENCE TO RELATED APPLICATIONS

This application is a U.S. National Phase of International Patent Application No. PCT/JP2020/026692 filed on Jul. 8, 2020, which claims priority benefit of Japanese Patent Application No. 2019-180259 filed in the Japan Patent Office on Sep. 30, 2019. Each of the above-referenced applications is hereby incorporated herein by reference in its entirety.

TECHNICAL FIELD

The present technology relates to a bioparticle analyzer and a microparticle analyzer. More specifically, the present invention relates to a bioparticle analyzer and a microparticle analyzer including a scattered light detection module.

BACKGROUND ART

For analysis of a bioparticle, light generated by irradiating the bioparticle with light is often used. Various proposals have been made on an optical system for detection of the light. For example, Patent Document 1 below discloses a transmission type fluorescence microscope in which a means for cutting excitation light is interposed between a sample and an objective lens in a fluorescence microscope using transmission illumination.

CITATION LIST

Patent Document

Patent Document 1: Japanese Patent Application Laid-Open No. H09-292570

SUMMARY OF THE INVENTION

Problems to be Solved by the Invention

A scattered light detection optical system may be used for analysis of a bioparticle. In the scattered light detection optical system, for example, a bioparticle is irradiated with a laser beam, and scattered light generated by the irradiation is detected by a scattered light detector. Until the scattered light reaches the scattered light detector, the scattered light is condensed by a condensing optical component such as an objective lens, for example, and then may be aberration-corrected by an aberration correction optical component such as a doublet lens, as necessary. These optical components generally have a configuration in which a plurality of lenses is bonded by an adhesive.

Depending on a configuration of the scattered light detection optical system, the laser beam may reach the condensing optical component or the aberration correction optical component. Since these optical components contain an adhesive as described above, the adhesive may be deteriorated when the laser beam reaches the adhesive. Deterioration of the adhesive results in deterioration of optical quality of these optical components, which may also result in deterioration of quality of the scattered light detected by the scattered light detector. In particular, in recent years, a power density of a laser beam has been improved with improvement of laser beam generation devices, and these problems tend to appear.

Therefore, a main object of the present technology is to prevent deterioration in quality of a scattered light detection optical system used for bioparticle analysis.

Solutions to Problems

The present technology provides a bioparticle analyzer including a scattered light detection module including: an optical filter configured to separate from scattered light generated by irradiating a bioparticle flowing through a channel with a laser beam and from partial light in the laser beam; and an objective lens on which the scattered light separated by the optical filter is incident.

In the present technology, the optical filter may be an optical filter having wavelength selectivity.

In one implementation of the present technology, the optical filter has an optical characteristic of transmitting the scattered light and not transmitting the partial light in the laser beam.

In this implementation, the optical filter may have an optical characteristic of not transmitting light in a wavelength range of at least a part of a wavelength range of 450 nm or less.

In this implementation, the optical filter may reflect the partial light in the laser beam.

In this implementation, the optical filter may be arranged such that light reflected by the optical filter reaches a region outside the channel.

In this implementation, arrangement may be made such that an incident angle of the laser beam on the optical filter is more than 0 degrees.

In this implementation, the optical filter may absorb the partial light in the laser beam.

In this implementation, the optical filter may also be any one selected from a group including an LWPF, an SWPF, a BPF, and a dichroic mirror.

In another implementation of the present technology, the optical filter has an optical characteristic of reflecting the scattered light and transmitting the partial light in the laser beam.

In this implementation, the optical filter may have an optical characteristic of transmitting light in a wavelength range of at least a part of a wavelength range of 450 nm or less.

In this implementation, the optical filter may be any one selected from a group including an LWPF, an SWPF, a BPF, and a dichroic mirror.

Moreover, in the present technology, the scattered light may be forward scattered light.

In addition, in the present technology, the bioparticle may be a cell.

Furthermore, the present technology also provides a microparticle analyzer including a scattered light detection module including: an optical filter configured to separate, from a partial light in a laser beam, scattered light generated by irradiating a microparticle flowing through a channel with the laser beam; and an objective lens on which the scattered light separated by the optical filter is incident.

BRIEF DESCRIPTION OF DRAWINGS

FIGS. 3A, 3B and 3C are views illustrating a structure example of a particle sorting unit of a bioparticle analysis microchip.

FIG. 4 is a diagram illustrating a configuration example of an optical system.

MODE FOR CARRYING OUT THE INVENTION

Hereinafter, a preferred mode for implementing the present technology will be described. Note that the embodiments described below show one example of a representative embodiment of the present technology, and do not cause the scope of the present technology to be narrowly interpreted. The present technology will be described in the following order.

1. First embodiment (bioparticle analyzer)
(1) Description of first embodiment
(2) Configuration example of bioparticle analyzer
(2-1) Bioparticle analysis microchip
(2-2-1) Implementation in which optical filter transmits scattered light
(2-2-2) Implementation in which optical filter reflects scattered light
(2-2) Optical system
(2-3) Control unit
(3) Another configuration example of bioparticle analyzer
2. Second embodiment (microparticle analyzer)
(1) Description of second embodiment
(2) Microparticle 1. First Embodiment (Bioparticle Analyzer)

(1) Description of First Embodiment

A scattered light detection module included in a bioparticle analyzer of the present technology includes: an optical filter configured to separate, from a partial light in a laser beam, scattered light generated by irradiating a bioparticle flowing through a channel with the laser beam; and an objective lens on which the scattered light separated by the optical filter is incident. The optical filter preferably has wavelength selectivity. The optical filter can prevent at least a part of the laser beam from being incident on the objective lens. As a result, it is possible to prevent deterioration in optical quality of the objective lens due to adhesive deterioration. Furthermore, the optical filter can also prevent deterioration in quality of other optical components including an adhesive.

Figure 1:
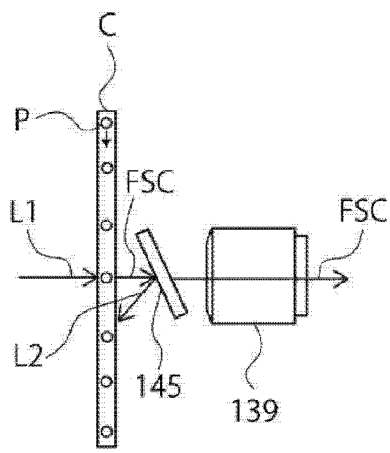
FIG. 1 is a view illustrating an arrangement example of an optical filter and an objective lens included in a bioparticle analyzer of the present technology.

The optical filter and the objective lens included in the scattered light detection module will be described below with reference to FIG. 1. FIG. 1 is a view for explaining an implementation in which the optical filter has an optical characteristic of transmitting the scattered light and not transmitting the partial light in the laser beam. FIG. 1 illustrates an arrangement example of the optical filter and the objective lens included in the bioparticle analyzer of the present technology.

As illustrated in FIG. 1, an optical filter 145 is arranged between a channel C and an objective lens 139. A bioparticle P flowing through the channel C is irradiated with a laser beam L1. By the irradiation, forward scattered light FSC is generated. The generated forward scattered light FSC is transmitted through the optical filter 145 and then incident on the objective lens 139. The forward scattered light FSC is condensed by the objective lens 139, and thereafter, detected by a forward scattered light detector (not illustrated).

For example, in a case where the laser beam L1 is obtained by synthesizing a plurality of laser beams having different wavelengths, light that does not need to be detected by the forward scattered light detector may also travel from the channel C toward the objective lens 139. When the light is incident on the objective lens 139, for example, an adhesive bonding a lens group included in the objective lens 139 may be deteriorated. The deterioration is likely to occur particularly in a case where a wavelength of the light is short.

As illustrated in FIG. 1, the optical filter 145 is arranged on an optical path between the channel C and the objective lens 139. The optical filter 145 has an optical characteristic of not transmitting partial light in the laser beam L1. As a result, it is possible to prevent at least a part of the light that does not need to be detected from being incident on the objective lens 139, and it is possible to prevent deterioration in optical quality of the objective lens 139. Furthermore, it is also possible to prevent deterioration in optical quality of other optical components that include an adhesive and may be present on an optical path between the objective lens 139 and the forward scattered light detection device.

The optical filter 145 may have an optical characteristic of reflecting at least a part of the light that does not need to be detected, or may have an optical characteristic of absorbing at least a part of the light. In FIG. 1, the optical filter 145 has an optical characteristic of reflecting partial light L2.

The example illustrated in FIG. 1 relates to detection of forward scattered light, but the scattered light detection module may be a detection module of side scattered light, backward scattered light, or the like, for example, in the present technology.

The channel C may be, for example, a channel provided in a bioparticle analysis microchip, and in particular may be a channel of a portion where the bioparticle is irradiated with light.

Examples of the bioparticle include, but are not limited to, a cell, a microorganism, a biologically-derived solid component, a liposome, and the like.

The cell may include an animal cell and a plant cell. Examples of the animal cell include a tumor cell and a blood cell. The microorganism may include, for example, bacteria such as *Escherichia coli* and fungi such as yeast. Examples of the biologically-derived solid component include solid crystals produced in a living body. Furthermore, in the present technology, the bioparticle may be, for example, a bound substance of a plurality of particles, such as, for example, two or three particles.

According to one implementation of the present technology, the bioparticle may be particularly a cell. The bioparticle analyzer of the present technology is suitable for analyzing cells, that is, may be used for analyzing cells.

In the present technology, the bioparticle is preferably in a state of being contained in a fluid. The fluid includes a liquid and a gas. Preferably, the fluid is a liquid. A type of the liquid may be appropriately selected by those skilled in the art in accordance with a type of the particle. For example, in a case where the bioparticle is a cell, for example, water, an aqueous solution (for example, a buffer solution), or a culture solution may be used as the liquid.

(2) Configuration Example of Bioparticle Analyzer

Figure 2:
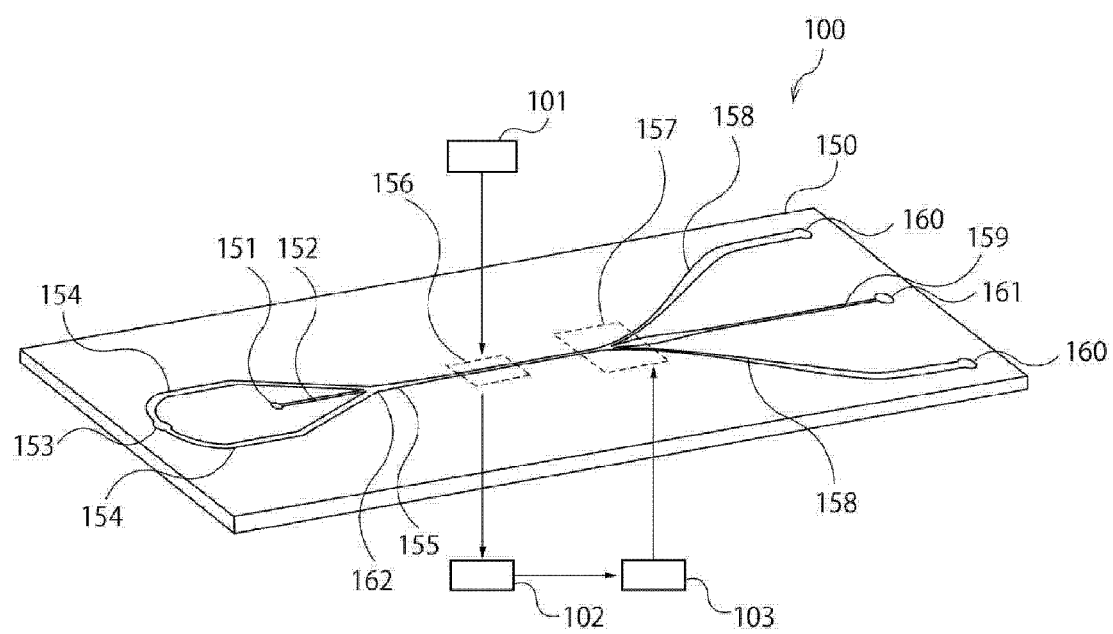
FIG. 2 is a view illustrating a configuration example of the bioparticle analyzer of the present technology.

FIG. 2 illustrates a configuration example of a bioparticle analyzer of the present technology. A bioparticle analyzer 100 illustrated in FIG. 2 includes a light irradiation unit 101, a detection unit 102 including a scattered light detection module 10, a control unit 103, and a bioparticle analysis microchip 150. The control unit 103 includes a signal processing unit 104, a determination unit 105, and a sorting control unit 106.

Hereinafter, the bioparticle analyzer 100 according to the present technology will be described in detail.

(2-1) Bioparticle Analysis Microchip

The bioparticle analysis microchip 150 is provided with a sample liquid inlet 151 and a sheath liquid inlet 153. From these inlets, a sample liquid and a sheath liquid are introduced into a sample liquid channel 152 and a sheath liquid channel 154, respectively. The sample liquid contains bioparticles.

The sample liquid and the sheath liquid merge at a merging portion 162 to form a laminar flow in which a periphery of the sample liquid is surrounded by the sheath liquid. The laminar flow flows through a main channel 155 toward a particle sorting unit 157.

The main channel 155 includes a detection region 156. In the detection region 156, the bioparticle in the sample liquid is irradiated with light. On the basis of fluorescence and/or scattered light generated by the irradiation with the light, the bioparticle is analyzed, and further, determination may be made as to whether or not the bioparticle should be collected. One position in the detection region 156 may be irradiated with one beam of light, or each of a plurality of positions in the detection region 156 may be irradiated with light. For example, the microchip 150 may be configured such that each of two different positions in the detection region 156 is irradiated with light (that is, there are two positions irradiated with light in the detection region 156). In this case, for example, whether the bioparticle should be collected may be determined on the basis of light (for example, fluorescence and/or scattered light, or the like) generated by light irradiation on the bioparticle at one position. Moreover, on the basis of a difference between a detection time of light generated by the light irradiation at the one position and a detection time of light generated by light irradiation at another position, a speed of the bioparticle in the channel can also be calculated. For the calculation, a distance between two irradiation positions may be determined in advance, and the speed of the bioparticle may be determined on the basis of a difference between the two detection times and the distance. Moreover, it is possible to accurately predict an arrival time at the particle sorting unit 157 described below on the basis of the speed. By accurately predicting the arrival time, it is possible to optimize a timing of forming a flow entering a particle sorting channel 159. Furthermore, in a case where a difference between an arrival time of a certain bioparticle at the particle sorting unit 157 and an arrival time of a bioparticle before or after the certain bioparticle at the particle sorting unit 157 is equal to or less than a predetermined threshold value, it can also be determined that the certain bioparticle is not to be sorted. In a case where a distance between the certain bioparticle and a bioparticle before or after is narrow, there is a high possibility that the bioparticle before or after is collected together when the certain bioparticle is suctioned. In a case where there is a high possibility that the bioparticle before or after is collected together, the collection of the bioparticle before or after can be prevented by determining that the certain bioparticle is not to be sorted. As a result, a purity of a target bioparticle among the collected bioparticles can be increased. A specific example of a microchip in which each of two different positions in the detection region 156 is irradiated with light and a device including the microchip is described in, for example, Japanese Patent Application Laid-Open No. 2014-202573.

In the particle sorting unit 157 in the microchip 150, the laminar flow flowing through the main channel 155 separately flows into two branch channels 158. The particle sorting unit 157 illustrated in FIG. 2 has two branch channels 158, but the number of branch channels is not limited to two. The particle sorting unit 157 may be provided with, for example, one or a plurality of (for example, such as two, three, or four) branch channels. The branch channel may be configured to branch in a Y shape on one plane as in FIG. 2, or may be configured to branch three-dimensionally.

Furthermore, in the particle sorting unit 157, only in a case where a bioparticle that should be collected flows, a flow entering the particle sorting channel 159 is formed, and the bioparticle is collected. The flow entering the particle sorting channel 159 may be formed, for example, by generating a negative pressure in the particle sorting channel 159. In order to generate the negative pressure, for example, an actuator 107 may be attached to the outside of the microchip 150 so that a wall of the particle sorting channel 159 may be deformed. The deformation of the wall changes an inner space of the particle sorting channel 159, and a negative pressure may be generated. The actuator 107 may be, for example, a piezo actuator. When the bioparticle is suctioned into the particle sorting channel 159, the sample liquid included in the laminar flow or the sample liquid and the sheath liquid included in the laminar flow may also flow into the particle sorting channel 159. In this manner, the bioparticle is sorted in the particle sorting unit 157.

FIGS. 3A, 3B and 3C illustrates an enlarged view of the particle sorting unit 157. As illustrated in FIG. 3A, the main channel 155 and the particle sorting channel 159 communicate with each other via an orifice portion 170 coaxial with the main channel 155. As illustrated in FIG. 3B, the bioparticle that should be collected flows into the particle sorting channel 159 through the orifice portion 170. The bioparticle that should not be collected flows into the branch channel 158 as illustrated in FIG. 3C.

In order to prevent entering of the bioparticles that should not be collected into the particle sorting channel 159 through the orifice portion 170, the orifice portion 170 may be provided with a gate flow inlet 171. When the sheath liquid is introduced from the gate flow inlet 171, and a flow from the orifice portion 170 toward the main channel 155 is formed by a part of the introduced sheath liquid, the bioparticle that should not be collected is prevented from entering the particle sorting channel 159. Note that the rest of the introduced sheath liquid flows into the particle sorting channel 159.

The laminar flow having flowed into the branch channel 158 may be discharged to the outside of the microchip at a branch channel end 160. Furthermore, the bioparticle collected into the particle sorting channel 159 may be discharged to the outside of the microchip at a particle sorting channel end 161. In this way, the target bioparticle is sorted by the microchip 150.

To the particle sorting channel end 161, a container may be connected. The bioparticles sorted by the particle sorting unit 157 are collected into the container.

Furthermore, to the particle sorting channel end 161, a particle collection channel may be connected. One end of the particle collection channel may be connected to the particle sorting channel end 161, and another end may be connected to a container (not illustrated) for collection of the bioparticles sorted into the particle sorting channel 159. As described above, according to one implementation of the present technology, the bioparticle analyzer 100 may include the particle collection channel for collection of the bioparticles sorted by the particle sorting unit 157 into the container. The sorted bioparticles are collected into the container through the particle collection channel.

In the present technology, "micro" means that at least a part of a channel included in the bioparticle analysis microchip 150 has a dimension on the order of μm, and particularly has a cross-sectional dimension on the order of μm. That is, in the present technology, the "microchip" refers to a chip including a channel on the order of μm, particularly a chip including a channel having a cross-sectional dimension on the order of μm. For example, a chip including a particle sorting unit including a channel having a cross-sectional dimension on the order of μm may be referred to as a microchip according to the present technology. In the present technology, the microchip may include, for example, the particle sorting unit 157. In the particle sorting unit 157, a cross section of the main channel 155 is, for example, rectangular, and a width of the main channel 155 may be, for example, 100 μm to 500 μm, and particularly 100 μm to 300 μm, in the particle sorting unit 157. A width of the branch channel branching from the main channel 155 may be smaller than the width of the main channel 155. A cross section of the orifice portion 170 is, for example, circular, and a diameter of the orifice portion 170 at a connection portion between the orifice portion 170 and the main channel 155 may be, for example, 10 μm to 60 μm, and particularly 20 μm to 50 μm. These dimensions regarding the channel may be appropriately changed in accordance with a size of the bioparticle.

A size of the channel of the microchip may be appropriately selected in accordance with a size and a mass of the bioparticle described above. In the present technology, a chemical or biological label such as, for example, a fluorescent dye may be attached to the bioparticle, as necessary. The label may further facilitate detection of the bioparticle. The label that should be attached may be appropriately selected by those skilled in the art.

The fluid flowing in the bioparticle analysis microchip 150 of the present technology is, for example, a liquid, a liquid material, or a gas, and is preferably a liquid. A type of the fluid may be appropriately selected by those skilled in the art in accordance with, for example, a type of the bioparticle to be sorted, and the like. For example, a commercially available sheath liquid and sample liquid, or a sheath liquid and a sample liquid known in the present technical field can be used as the fluid.

The bioparticle analysis microchip 150 may be manufactured by a method known in the technical field. For example, the bioparticle analysis microchip 150 can be manufactured by bonding two or more substrates on which a predetermined channel is formed. The channel may be formed in all of two or more substrates (particularly, two substrates), for example, or may be formed only in some of the two or more substrates (particularly, one of the two substrates). In order to more easily adjust a position at the time of bonding the substrates, the channel is preferably formed only on one substrate.

As a material for forming the bioparticle analysis microchip 150, a material known in the technical field may be used. Examples thereof include, but are not limited to, polycarbonate, cycloolefin polymer, polypropylene, polydimethylsiloxane (PDMS), polymethyl methacrylate (PMMA), polyethylene, polystyrene, glass, and silicon, for example. In particular, polymer materials such as, for example, polycarbonate, cycloolefin polymer, and polypropylene are particularly preferable because they are excellent in processability and enable a microchip to be manufactured inexpensively using a molding apparatus.

The bioparticle analysis microchip 150 is preferably transparent. For example, in the bioparticle analysis microchip 150, at least a portion through which light (a laser beam and scattered light) passes may be transparent, and for example, a detection region may be transparent. The entire bioparticle analysis microchip 150 may be transparent.

Note that, in the present embodiment, a case where the channel through which the bioparticle flows is formed in the disposable bioparticle analysis microchip 150 is shown, but the channel may not be formed in the microchip 150, in the present technology.

In this case, a form of the channel is not particularly limited and can be freely designed. For example, a channel formed in a substrate such as two-dimensional or three-dimensional plastic or glass can be used.

Furthermore, the channel may be, for example, a channel provided in a flow cell.

(2-2) Optical System (2-2-1) Implementation in which Optical Filter Transmits Scattered Light In one implementation of the present technology, the optical filter may have an optical characteristic of transmitting the scattered light and not transmitting the partial light in the laser beam. A configuration example of an optical system according to this implementation will be described with reference to FIG. 4. FIG. 4 illustrates a configuration example of an optical system 130 for irradiation on a bioparticle flowing through a channel with a laser beam and detection of fluorescence and/or scattered light generated by the irradiation.

The optical system includes the light irradiation unit 101 and the detection unit 102. The light irradiation unit 101 irradiates a bioparticle flowing in a channel in the bioparticle analysis microchip 150 with light (for example, excitation light or the like) to excite scattered light and/or fluorescence. The detection unit 102 detects scattered light and/or fluorescence generated from the bioparticle by the light irradiation by the light irradiation unit 101.

The light irradiation unit 101 may include a laser beam generation unit 131, mirrors 134 and 135, and an objective lens 136 that condenses excitation light on a bioparticle flowing in a detection region. The light source may be appropriately selected by those skilled in the art in accordance with a purpose of analysis, and may be, for example, a laser diode, a SHG laser, a solid-state laser, a gas laser, or a high-intensity LED, or a combination of two or more thereof. The light irradiation unit 101 may include other optical elements, as necessary.

The laser beam generation unit 131 generates a laser beam with which the detection region 156 is irradiated. The laser beam generation unit 131 includes, for example, laser beam sources 132-1, 132-2, and 132-3, and further includes a group of mirrors 133-1, 133-2, and 133-3 that synthesize laser beams emitted from these laser beam sources.

The laser beam sources 132-1, 132-2, and 132-3 emit laser beams having different wavelengths.

The laser beam source 132-1 emits a laser beam having a wavelength of, for example, 550 nm to 800 nm (for example, a wavelength of 637 nm). The mirror 133-1 has an optical characteristic of reflecting the laser beam.

The laser beam source 132-2 emits a laser beam having a wavelength of, for example, 450 nm to 550 nm (for example, a wavelength of 488 nm). The mirror 133-2 has an optical characteristic of reflecting the laser beam and transmitting the laser beam emitted from the laser beam source 132-1.

The laser beam source 132-3 emits a laser beam having a wavelength of, for example, 380 nm to 450 nm (for example, a wavelength of 405 nm). The mirror 133-3 has an optical characteristic of reflecting the laser beam and transmitting the two laser beams emitted from the laser beam sources 132-1 and 132-2.

By arranging the three laser beam sources and the three mirrors as illustrated in FIG. 4, the laser beam with which the bioparticle is irradiated is synthesized.

The laser beam is transmitted through the mirror 134, is then reflected by the mirror 135, and is incident on the objective lens 136. The laser beam is transmitted through the objective lens 136 and reaches the detection region 156 of the bioparticle analysis microchip 150. The bioparticle flowing through the detection region 156 is irradiated with the laser beam, and fluorescence and scattered light are generated.

A beam diameter of the laser beam may be, for example, 2 mm or less, particularly 1.5 mm or less, and more particularly 1 mm or less. The beam diameter may be, for example, 0.005 mm or more, particularly 0.015 mm or more, and more particularly 0.05 mm or more.

A power density of the laser beam is, for example, 0.09 kW/cm$^2$ to 5 kW/cm$^2$, particularly 0.4 kW/cm$^2$ to 3 kW/cm$^2$, and more particularly 0.9 kW/cm$^2$ to 2 kW/cm$^2$. As the power density is higher, the problem of adhesive deterioration described above is more likely to appear. In a case where a laser beam having such a power density is used, the effects of the present technology are easily exhibited.

The detection unit 102 includes a fluorescence detector 137 that detects the fluorescence. The fluorescence is incident on the objective lens 136 and then condensed by the objective lens 136. The fluorescence condensed by the objective lens 136 is transmitted through the mirror 135 and is detected by the fluorescence detector 137.

The detection unit 102 includes the scattered light detection module 10. The configuration example illustrated in FIG. 4 illustrates a case where the scattered light detection module 10 is particularly a forward scattered light detection module. The scattered light detection module 10 includes: the optical filter 145 configured to transmit scattered light generated by irradiating a bioparticle flowing through a channel with a laser beam; and the objective lens 139 on which the scattered light transmitted through the optical filter 145 is incident. Furthermore, the optical filter 145 has an optical characteristic of not transmitting partial light in the laser beam.

The objective lens has a bonding surface using an adhesive, and it is known that the adhesive is deteriorated by irradiation with partial light in the laser beam with which the bioparticle flowing through the channel has been irradiated, and as a result, quality of an optical surface is deteriorated. On the other hand, in the present technology, since the scattered light detection module 10 includes the optical filter 145, it is possible to prevent the objective lens from being irradiated with partial light in the laser beam and to prevent deterioration in the quality of the objective lens.

The optical filter 145 has an optical characteristic of transmitting scattered light generated by irradiating a bioparticle flowing through a channel with a laser beam and not transmitting partial light in the laser beam. The optical filter 145 may selectively extract only a part of information of light included in scattered light by an action such as reflection or absorption. For example, wavelength selectivity or light intensity selectivity may provide the optical characteristic.

Note that, in FIG. 4, the optical filter 145 has an optical characteristic of reflecting the partial light, but the optical filter 145 may have an optical characteristic of absorbing the partial light.

In the present technology, examples of the optical filter 145 include a color glass filter and an interference filter. Examples of the color glass filter include, for example, a sharp cut filter (a filter that blocks light having a wavelength equal to or shorter than a specific wavelength or equal to or longer than the specific wavelength, and transmits light having a wavelength longer than the specific wavelength or shorter than the specific wavelength). Examples of the interference filter include a band pass filter and a dichroic mirror or a dichroic filter. A shape of the optical filter 145 may be appropriately selected in accordance with the partial light, and may be, for example, a circle, an ellipse, a quadrangle, a polygon, or the like. A thickness of the optical filter 145 may be, for example, 0.001 mm to 10 mm, particularly 0.05 mm to 5 mm, and more particularly 0.1 mm to 3 mm.

The optical filter 145 may have wavelength selectivity. The wavelength selectivity may be selected depending on a wavelength of light that should not be transmitted by the optical filter 145.

More particularly, the optical filter 145 preferably has an optical characteristic of not transmitting light in a wavelength range of at least a part or all of a wavelength range of 450 nm or less, more preferably has an optical characteristic of not transmitting light in a wavelength range of at least a part or all of a wavelength range of 440 nm or less, and particularly preferably has an optical characteristic of not transmitting light in a wavelength range of at least a part or all of the wavelength range of 430 nm or less. Since light in such a short wavelength range easily causes adhesive deterioration, an optical filter having the optical characteristic described above is preferable in the present technology.

Furthermore, the optical filter 145 may have an optical characteristic of not transmitting at least light having a wavelength range of 400 nm to 410 nm, and may have an optical characteristic not transmitting at least light having a wavelength of 405 nm. In this case, the optical filter 145 may have an optical characteristic of not transmitting light including light in the wavelength range or light with the wavelength, and may have an optical characteristic of not transmitting all light of 430 nm or less, for example.

In this implementation, the optical filter 145 may reflect partial light in the laser beam. The optical filter 145 of a reflection type can reflect the partial light to prevent the partial light from being incident on the objective lens 139. When the optical filter 145 of the reflection type is adopted, leakage of the partial light can be prevented as compared with a case of an absorption type, and it is not necessary to consider heat generated when the partial light is absorbed.

Specifically, as the optical filter 145 that reflects the partial light, for example, a long wavelength pass filter (LWPF), a short wavelength pass filter (SWPF), a band pass filter (BPF), or a dichroic mirror may be used.

Figure 5:
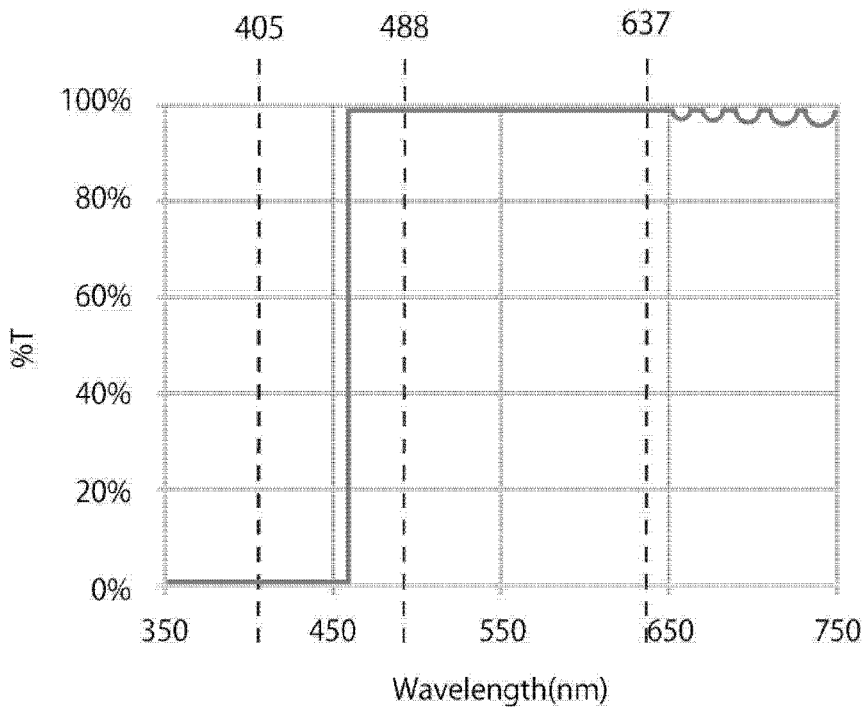
FIG. 5 is a graph illustrating a relationship between a transmittance and a wavelength of light in an optical filter.

FIG. 5 is a graph illustrating a relationship between a transmittance (%) and a wavelength (nm) of light in a case where the optical filter 145 is the long wavelength pass filter (LWPF). As illustrated in FIG. 5, the LWPF does not transmit light having a wavelength equal to or less than a certain wavelength.

Furthermore, in order to reflect light in a short wavelength range that is likely to cause adhesive deterioration, the optical filter 145 may be preferably the LWPF, the BPF, or the dichroic mirror.

In this implementation, the optical filter 145 may be arranged such that light reflected by the optical filter 145 reaches a region outside the channel. For example, the optical filter 145 may be arranged such that light reflected by the optical filter 145 reaches at least a region outside the detection region 156. More specifically, a surface of the optical filter 145 may be arranged at an angle with respect to a scattered light emission surface of the channel, for example, such that light reflected by the optical filter 145 reaches a region outside the channel or a region outside the detection region 156 as described above. Such an arrangement makes it possible to prevent deterioration in detection signal quality due to light reflected by the optical filter 145 reaching the detection region 156.

In this implementation, in a case where the optical filter 145 is configured to reflect the partial light, the optical filter 145 may be arranged such that an incident angle of the laser beam on the optical filter 145 (particularly, an incident angle of an optical axis portion of the laser beam) is more than 0 degrees, and may be arranged such that, for example, the incident angle is 0.1 degrees or more, particularly 0.5 degrees or more, more particularly 1 degree or more, and even more particularly 2 degrees or more. The incident angle may be, for example, 45 degrees or less, particularly 10 degrees or less, and more particularly 5 degrees or less.

By setting the incident angle to, for example, more than 0 degrees, it is possible to prevent deterioration in quality of a detection signal, which may be caused by reflected light reaching the channel. Furthermore, in a case where the incident angle is too large, a so-called blue shift may occur, and thus the incident angle is preferably equal to or less than the upper limit value described above.

Furthermore, in this implementation, the optical filter 145 may be configured to absorb the partial light. By adopting the optical filter 145 of the absorption type, it is not necessary to consider return light as compared with a case of adopting the reflection type. Examples of the optical filter include an LWPF, an SWPF, and a BPF. Furthermore, in order to reflect light in a short wavelength range that is likely to cause adhesive deterioration, the optical filter 145 may be preferably the LWPF or the BPF.

In this configuration example, forward scattered light is incident on the optical filter 145, and a part of the scattered light transmitted through the optical filter 45 is incident on the objective lens 139, and is then separated into red light and blue light by a mirror 140. The mirror 140 may be, for example, a half mirror, and has an optical characteristic of reflecting red light and transmitting blue light.

The red light is reflected by a mirror 141 and then detected by a scattered light detector 138-2. The scattered light detector 138-2 selectively detects light having a wavelength of, for example, 550 nm to 800 nm (for example, a wavelength of 637 nm).

The blue light is detected by a scattered light detector 138-3. The scattered light detector 138-2 selectively detects light having a wavelength of, for example, 450 nm to 550 nm (for example, a wavelength of 488 nm).

On optical paths of the forward scattered light, for example, doublet lenses 142, 143, and 144 may be provided. These doublet lenses correct aberration of light transmitted through each doublet lens. Similarly to the objective lens 139, the doublet lenses 142, 143, and 144 also have a bonding surface using an adhesive. Therefore, by including the optical filter 145, deterioration of the adhesive can be prevented, and as a result, deterioration in quality of optical surfaces of these doublet lenses can be avoided.

The detection unit 102 includes a scattered light detector 138-1 that detects backward scattered light among the scattered light. The backward scattered light is incident on the objective lens 136 and is then condensed by the objective lens 136. The backward scattered light condensed by the objective lens 136 is reflected by the mirror 135,
then further reflected by the mirror 134, and then detected by the scattered light detector 138-1. The scattered light detector 138-1 detects, for example, green light. The scattered light detector 138-1 selectively detects light having a wavelength of, for example, 380 nm to 450 nm (for example, a wavelength of 405 nm).

As a detector in the detection unit 102, a PMT, a photodiode, a CCD, a CMOS, or the like may be used, but the detector is not limited thereto. The detection unit 102 may include other optical elements, as necessary. The detection unit 102 may convert detected light into an analog electric signal by photoelectric conversion. The detection unit 102 may further convert the analog electric signal into a digital electric signal by AD conversion.

(2-2-2) Implementation in which Optical Filter Reflects Scattered Light

In another implementation of the present technology, the optical filter has an optical characteristic of reflecting the scattered light and transmitting the partial light in the laser beam. This implementation will be described below with reference to FIG. 6.

Figure 6:
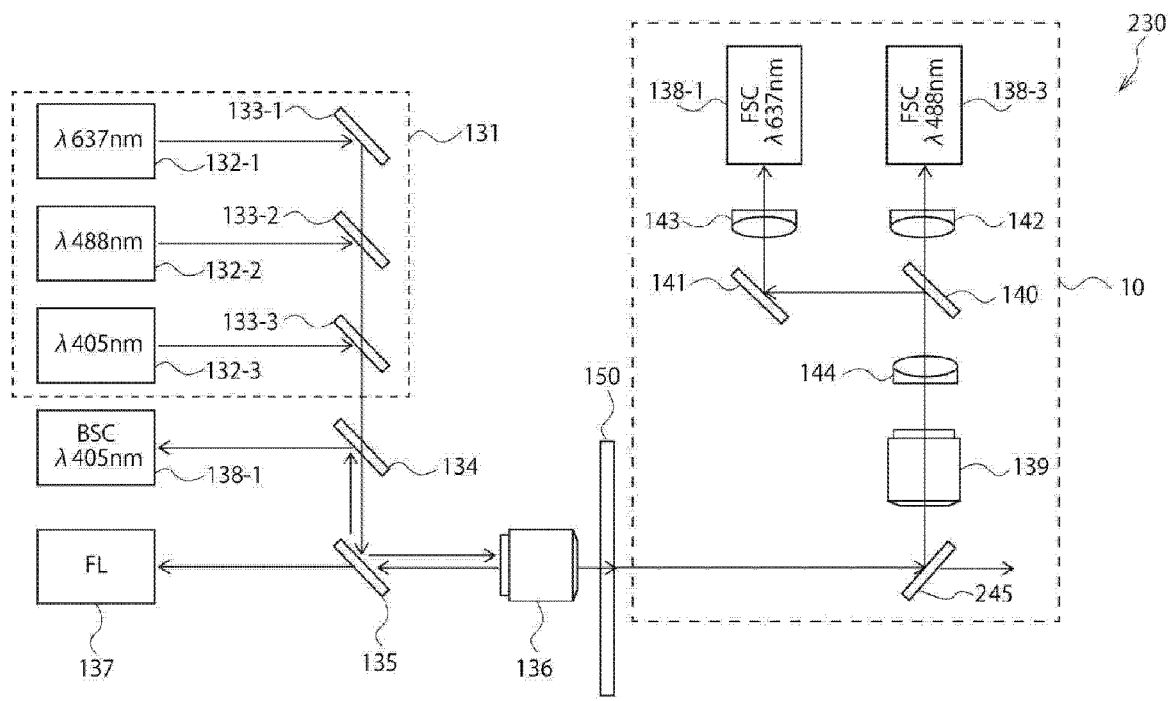
FIG. 6 is a diagram illustrating a configuration example of the optical system.

An optical filter 245 included in an optical system 230 illustrated in FIG. 6 has an optical characteristic of reflecting the scattered light and transmitting the partial light in the laser beam. Other components of the optical filter 245 are the same as those included in the optical system 130 illustrated in FIG. 4. Also with an optical system having such a configuration, effects similar to the effects described in the above-described "(2-2-1) Implementation in which optical filter transmits scattered light" are exhibited.

The optical filter 245 preferably has an optical characteristic of transmitting light in a wavelength range of at least a part of a wavelength range of 450 nm or less, more preferably has an optical characteristic of transmitting light in a wavelength range of at least a part of a wavelength range of 440 nm or less, and particularly preferably has an optical characteristic of transmitting light in a wavelength range of at least a part of a wavelength range of 430 nm or less.

The optical filter 245 may reflect all or a part of light within a wavelength range exceeding the upper limit value described above. The optical filter 245 preferably has an optical characteristic of reflecting light of a wavelength of scattered light that should be detected.

In this implementation, for example, light in a short wavelength range is transmitted, while light in a long wavelength range may be reflected by the optical filter 245. Since light reflected by the optical filter 245 is incident on the objective lens 139 and light in a short wavelength range is not incident on the objective lens 139, it is possible to avoid adhesive deterioration due to the light in the short wavelength region of the objective lens 139.

The optical filter 245 may have an optical characteristic of transmitting at least light within a wavelength range of 400 nm to 410 nm, and may have an optical characteristic of transmitting at least light having a wavelength of 405 nm. In this case, the optical filter 245 may have an optical characteristic of not transmitting (preferably reflecting) light having a wavelength exceeding the wavelength range, and may have an optical characteristic of not transmitting (preferably reflecting) all light having a wavelength exceeding 430 nm, for example.

As the optical filter 245 that reflects the partial light, for example, an LWPF, an SWPF, a BPF, or a dichroic mirror may be used. Preferably, the optical filter 245 may be the SWPF, the BPF, or the dichroic mirror in order to transmit light in a short wavelength range.

(2-3) Control Unit

Figure 7:
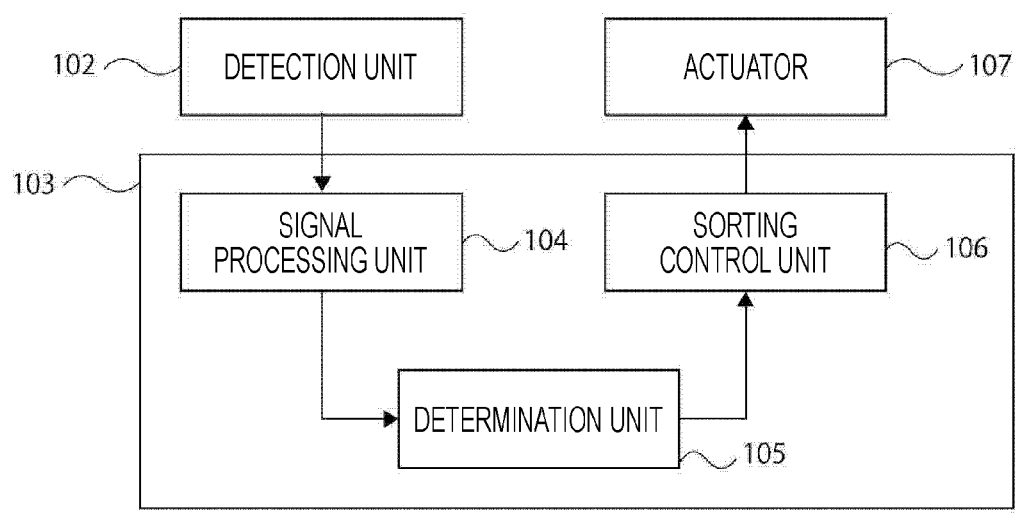
FIG. 7 is an example of a block diagram of a control unit.

FIG. 7 is an example of a block diagram of a control unit. The control unit 103 sorts only a bioparticle that should be collected, by controlling a flow in the bioparticle analysis microchip 150 in accordance with a characteristic of light detected by the detection unit 102.

The signal processing unit 104 included in the control unit 103 may process a waveform of a digital electric signal obtained by the detection unit 102, and generate information regarding a characteristic of light used for determination by the determination unit 105. As the information regarding the characteristic of the light, the signal processing unit 104 may acquire, from a waveform of the digital electric signal, for example, one, two, or three of: a width of the waveform; a height of the waveform; and an area of the waveform. Furthermore, the information regarding the characteristic of the light may include, for example, time when the light is detected.

On the basis of light generated by irradiating a bioparticle flowing in the channel with light, the determination unit 105 included in the control unit 103 determines whether to sort the bioparticle. More specifically, light generated by light irradiation on the bioparticle by the light irradiation unit 101 is detected by the detection unit 102, a waveform of a digital electric signal obtained by the detection unit 102 is processed by the control unit 103, and the determination unit 105 determines whether to sort the bioparticle on the basis of a characteristic of the light generated by the processing.

The sorting control unit 106 included in the control unit 103 controls bioparticle sorting by the bioparticle analysis microchip 150. More specifically, the sorting control unit 106 may control a flow of a fluid in the sorting unit 157 in the bioparticle analysis microchip 150 so as to sort a bioparticle determined to be sorted by the determination performed by the determination unit 105. In order to control the flow, the sorting control unit 106 may control, for example, driving of the actuator 107 provided in the vicinity of the sorting unit. A driving timing of the actuator 107 may be set on the basis of, for example, time when the light is detected.

Furthermore, the control unit 103 may control light irradiation by the light irradiation unit 101 and/or light detection by the detection unit 102. Moreover, the control unit 103 may control driving of a pump for supply of a fluid into the bioparticle analysis microchip 150. The control unit 103 may include, for example, a CPU, a memory, and a hard disk that stores an OS and a program for causing the bioparticle analyzer to execute a bioparticle analysis method according to the present technology. For example, functions of the control unit 103 may be realized in a general-purpose computer. The program may be recorded in a recording medium such as, for example, a microSD memory card, an SD memory card, or a flash memory. The program recorded in the recording medium may be read by a drive included in a bioparticle sorting device 1000, and then the control unit 103 may cause the bioparticle analyzer 100 to execute the bioparticle analysis method according to the present technology in accordance with the read program.

(3) Another Configuration Example of Bioparticle Analyzer

The bioparticle analyzer of the present technology may be configured as a device, for example, such as a flow cytometer, which generates a bioparticle-containing droplet applied with an electric charge, and then sorts a bioparticle by controlling a moving direction of the droplet. An example of this configuration will be described below with reference to FIG. 8.

Figure 8:
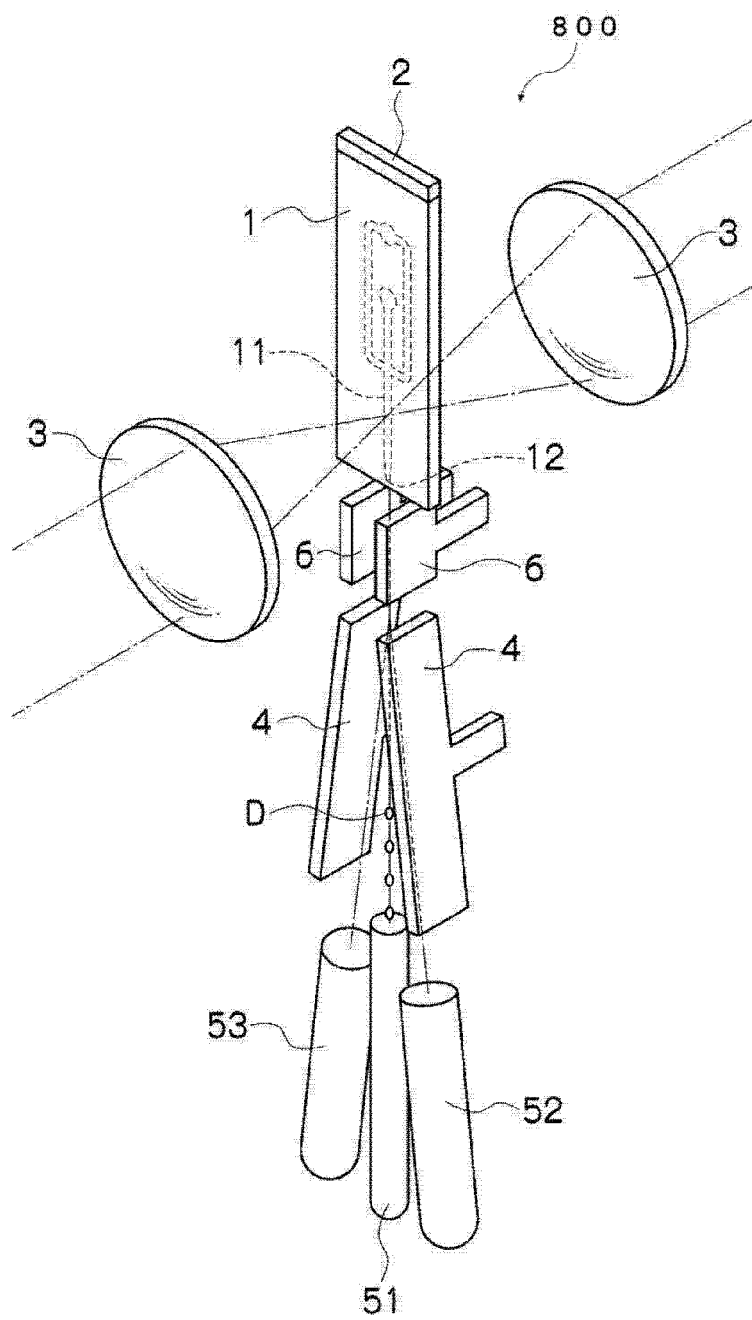
FIG. 8 is a view illustrating another configuration example of the bioparticle analyzer of the present technology.

In FIG. 8, a bioparticle sorting device 800 that generates a bioparticle-containing droplet applied with an electric charge and then sorts a bioparticle by controlling a moving direction of the droplet includes a microchip 1, a scattered light detection module 3, a counter electrodes 4, and a grounded counter electrode 6 that is grounded. Moreover, the bioparticle sorting device 800 may include containers 51 to 53 for collection of droplets whose moving direction has been controlled.

The microchip 1 generates a bioparticle-containing droplet. In the microchip 1, a channel 11 through which a bioparticle-containing liquid flows is formed. In the channel 11, the bioparticle-containing liquid flows as a laminar flow. In the laminar flow, bioparticles are arranged in a line at intervals.

The bioparticle-containing liquid is discharged from an orifice 12 provided at one end of the channel 11 to a space outside the chip. At this time, when the microchip 1 is vibrated by a vibrating element 2, a droplet D is obtained from the bioparticle-containing liquid.

A scattered light detection module 3 irradiates a bioparticle flowing in the channel 11 with a laser beam and detects scattered light generated by the irradiation. The scattered light detection module 3 includes: an optical filter configured to separate, from partial light in a laser beam, scattered light generated by irradiating a bioparticle flowing through the channel 11 with the laser beam; and an objective lens on which the scattered light separated by the optical filter is incident. The scattered light detection module 3 may be configured as described in "(1) Description of first embodiment" and "(2) Configuration example of bioparticle analyzer" described above.

The droplet D may include a bioparticle as a sorting target. The counter electrodes 4 are arranged along a moving direction of droplets discharged into a space outside the chip, and are arranged so as to face each other with the moving droplet interposed in between. The discharged droplets are applied with an electric charge by a charging device (not illustrated) in accordance with scattered light detected by the scattered light detection module 3. The counter electrodes 4 control the moving direction of the droplet by an electric repulsive force (or suction force) with respect to the electric charge applied to the droplet, and guides the droplet to any one of the containers 51 to 53. As a result, bioparticles as the sorting target may be collected in any two of the containers 51 to 53 (for example, 51 and 53), and bioparticles that are not the sorting target may be collected in another container (for example, 52). Alternatively, bioparticles as the sorting target may be collected in, for example, any one of the containers 51 to 53 (for example, 52), and bioparticles that are not the sorting target may be collected in other containers (for example, 51 and 53). In this way, the bioparticle as the sorting target is sorted.

2. Second Embodiment (Microparticle Analyzer)

(1) Description of Second Embodiment

A microparticle analyzer of the present technology includes a scattered light detection module including: an optical filter configured to transmit scattered light generated by irradiating a microparticle flowing through a channel with a laser beam; and an objective lens on which scattered light transmitted through the optical filter is incident, and the optical filter has an optical characteristic of not transmitting partial light in the laser beam.

The microparticle analyzer of the present technology is similar to the above-described bioparticle analyzer except that the analysis target is a microparticle.

(2) Microparticle

Examples of the microparticle include, but are not limited to, the above-described bioparticle, and synthetic particles such as a latex bead, a gel bead, a magnetic bead, and a quantum dot.

The synthetic particles may be particles including, for example, an organic or inorganic polymer material, a metal, or the like. The organic polymer material includes polystyrene, styrene/divinylbenzene, polymethyl methacrylate, and the like. The inorganic polymer material includes glass, silica, a magnetic material, and the like. The metal may include gold colloid, aluminum, and the like.

Note that the present technology can also have the following configurations.

[1] A bioparticle analyzer including
a scattered light detection module including:
an optical filter configured to separate, from partial light in a laser beam, scattered light generated by irradiating a bioparticle flowing through a channel with the laser beam; and
an objective lens on which the scattered light separated by the optical filter is incident.
[2] The bioparticle analyzer according to [1], in which the optical filter is an optical filter having wavelength selectivity.
[3] The bioparticle analyzer according to [1] or [2], in which the optical filter has an optical characteristic of transmitting the scattered light and not transmitting the partial light in the laser beam.
[4] The bioparticle analyzer according to [3], in which the optical filter has an optical characteristic of not transmitting light in a wavelength range of at least a part of a wavelength range of 450 nm or less.
[5] The bioparticle analyzer according to [3] or [4], in which the optical filter reflects the partial light in the laser beam.
[6] The bioparticle analyzer according to [5], in which the optical filter is arranged such that light reflected by the optical filter reaches a region outside the channel.
[7] The bioparticle analyzer according to any one of [3] to [6], in which the optical filter is arranged such that an incident angle of the laser beam on the optical filter is more than 0 degrees.
[8] The bioparticle analyzer according to [3], in which the optical filter absorbs the partial light.
[9] The bioparticle analyzer according to any one of [3] to [8], in which the optical filter is any one selected from a group including an LWPF, an SWPF, a BPF, and a dichroic mirror.
[10] The bioparticle analyzer according to [1], in which the optical filter has an optical characteristic of reflecting the scattered light and transmitting the partial light in the laser beam.
[11] The bioparticle analyzer according to [10], in which the optical filter has an optical characteristic of transmitting light in a wavelength range of at least a part of a wavelength range of 450 nm or less.
[12] The bioparticle analyzer according to [10] or [11], in which the optical filter is any one selected from a group including an LWPF, an SWPF, a BPF, and a dichroic mirror.
[13] The bioparticle analyzer according to any one of [1] to [12], in which the scattered light is forward scattered light.
[14] The bioparticle analyzer according to any one of [1] to [13], in which the bioparticle is a cell.
[15] A microparticle analyzer including
a scattered light detection module including:
an optical filter configured to separate, from partial light in a laser beam, scattered light generated by irradiating a microparticle flowing through a channel with the laser beam; and
an objective lens on which the scattered light separated by the optical filter is incident.

REFERENCE SIGNS LIST

10 Scattered light detection module
100 Bioparticle analyzer
101 Light irradiation unit
102 Detection unit
103 Control unit
104 Signal processing unit
105 Determination unit
106 Sorting control unit
107 Actuator
130 Optical system
136, 139 Objective lens
142, 143, 144 Doublet lens
145 Optical filter
150 Bioparticle analysis microchip
C Channel

The invention claimed is:
1. A bioparticle analyzer, comprising:
a scattered light detection system that includes:
an optical filter configured to separate scattered light from partial light in a laser beam, wherein
the scattered light is generated by irradiation of a bioparticle with the laser beam,
the bioparticle flows through a channel, and
the optical filter has wavelength selectivity;
an objective lens configured to receive the scattered light separated by the optical filter; and a doublet lens, wherein the objective lens is between the optical filter and the doublet lens.

2. The bioparticle analyzer according to claim 1, wherein the optical filter is further configured to:
   transmit the scattered light; and
   prevent transmission of the partial light in the laser beam.

3. The bioparticle analyzer according to claim 2, wherein the optical filter is further configured to prevent transmission of light in a wavelength range of at least a part of a wavelength range of 450 nm or less.

4. The bioparticle analyzer according to claim 2, wherein the optical filter is further configured to reflect the partial light in the laser beam.

5. The bioparticle analyzer according to claim 4, wherein the light reflected by the optical filter reaches a region outside the channel.

6. The bioparticle analyzer according to claim 2, wherein an incident angle of the laser beam on the optical filter is more than 0 degrees.

7. The bioparticle analyzer according to claim 2, wherein the optical filter is further configured to absorb the partial light in the laser beam.

8. The bioparticle analyzer according to claim 2, wherein the optical filter includes one selected from the group consisting of a long wavelength pass filter (LWPF), a short wavelength pass filter (SWPF), a band pass filter (BPF), and a dichroic mirror.

9. The bioparticle analyzer according to claim 1, wherein the optical filter is further configured to:
   reflect the scattered light; and
   transmit the partial light in the laser beam.

10. The bioparticle analyzer according to claim 9, wherein the optical filter is further configured to transmit light in a wavelength range of at least a part of a wavelength range of 450 nm or less.

11. The bioparticle analyzer according to claim 9, wherein the optical filter includes one selected from the group consisting of a long wavelength pass filter (LWPF), a short wavelength pass filter (SWPF), a band pass filter (BPF), and a dichroic mirror.

12. The bioparticle analyzer according to claim 1, wherein the scattered light includes forward scattered light.

13. The bioparticle analyzer according to claim 1, wherein the bioparticle includes a cell.

14. A microparticle analyzer, comprising:
   a scattered light detection system that includes:
      an optical filter configured to separate scattered light from partial light in a laser beam, wherein
      the scattered light is generated by irradiation of a microparticle with the laser beam,
      the microparticle flows through a channel, and
      the optical filter has wavelength selectivity;
   an objective lens configured to receive the scattered light separated by the optical filter; and
   a doublet lens, wherein the objective lens is between the optical filter and the doublet lens.

* * * * *